UNITED STATES PATENT OFFICE.

ALEXANDER HAMILL, OF BALTIMORE, MARYLAND.

IMPROVED COMPOSITION FOR LUBRICATING.

Specification forming part of Letters Patent No. 38,822, dated June 9, 1863.

*To all whom it may concern:*

Be it known that I, ALEXANDER HAMILL, of the city of Baltimore, in the State of Maryland, have invented a new and useful Composition for Lubricating; and I do hereby declare the following to be a full, and correct description of the same.

The nature of my invention consists in combining pulverized soapstone with crude petroleum, coal-oil, or any of its products suitable for the purpose, in order to produce a lubricator suitable for use on axles and heavy machinery.

I take equal quantities, by measurement, of crude petroleum and finely-pulverized soapstone, and mix them thoroughly together in any suitable manner. When thus incorporated they form a lubricator more elastic, cooler, and far cheaper than any other lubricator now in use.

The other ingredients above mentioned may be substituted for the petroleum, if preferred, and the proportions may be varied according to the character of the machinery to be lubricated.

What I claim as my invention, and desire to secure by Letters Patent, is—

The mixture, in suitable proportions, of pulverized soapstone with crude petroleum, coal-oil, or any of its products, to form a lubricator for machinery.

The above specification of my said invention signed and witnessed at Washington this 20th day of April, A. D. 1863.

ALEX. HAMILL.

Witnesses:
CHAS. F. STANSBURY,
ROBERT W. HAMILL.